United States Patent [19]

Manoogian et al.

[11] 4,433,333
[45] Feb. 21, 1984

[54] TRANSMITTER PEAK POWER EFFICIENT PSEUDO-BLINK ARM DECOY SYSTEM

[75] Inventors: David V. Manoogian, Lynnfield; Bernard H. Labitt, Needham; Joseph R. Wood, Lawrence, all of Mass.

[73] Assignee: The United States of America as represented by the Secretary of the Army, Washington, D.C.

[21] Appl. No.: 269,282

[22] Filed: Jun. 1, 1981

[51] Int. Cl.³ ............................................... G01S 7/36
[52] U.S. Cl. .................................................. 343/18 E
[58] Field of Search ..................................... 343/18 E

[56] References Cited

U.S. PATENT DOCUMENTS 3,806,930  4/1974  Gobert ........................ 343/100 SA
4,347,513  8/1982  Schindler ....................... 343/18 E

*Primary Examiner*—Maynard R. Wilbur
*Assistant Examiner*—M. R. Gordon
*Attorney, Agent, or Firm*—Robert P. Gibson; Anthony T. Lane; Robert C. Sims

[57] ABSTRACT

A technique using sector antennas on a plurality of decoy transmitters such that each antenna only has to cover a portion of the required azimuth coverage but the total azimuth is covered at all times by all the decoy transmitters. Switching between sectors of the various decoy transmitters is done to provide pseudo-blinking decoy field.

4 Claims, 2 Drawing Figures

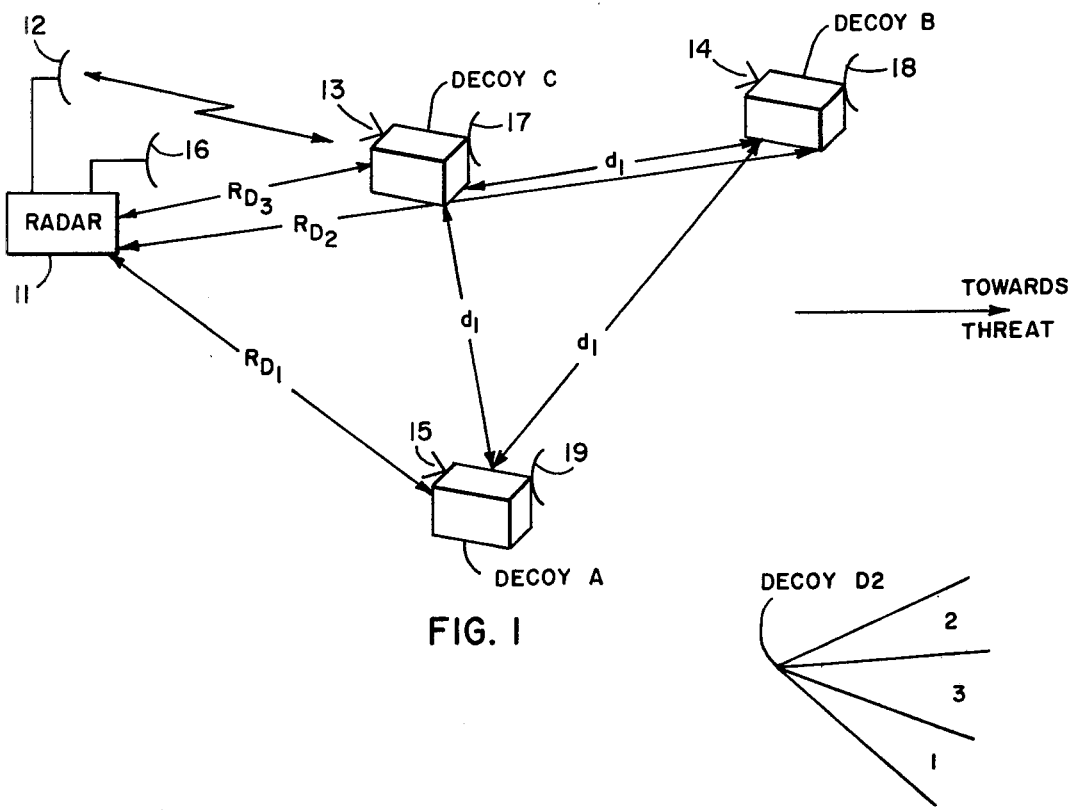
FIG. 1
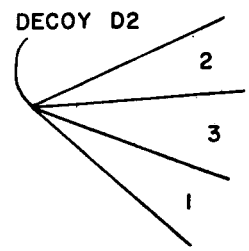
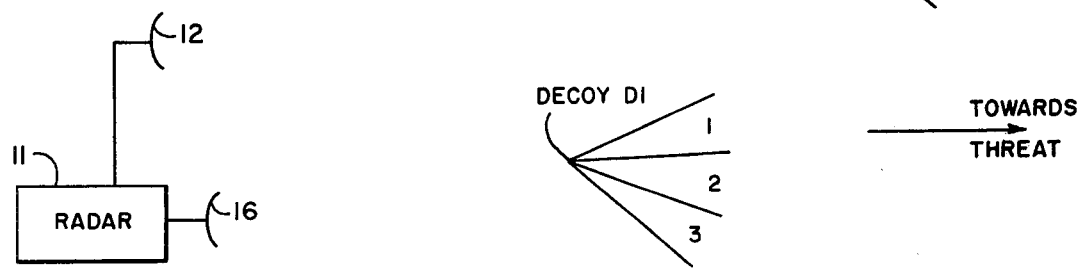
FIG. 2
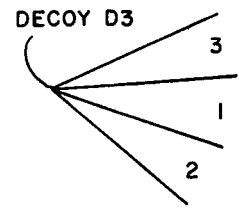

TRANSMITTER PEAK POWER EFFICIENT PSEUDO-BLINK ARM DECOY SYSTEM

DEDICATORY CLAUSE

The invention described herein was made in the course of or under a contract or subcontract thereunder with the Government and may be manufactured, used, and licensed by or for the Government for governmental purposes without the payment to us of any royalties thereon.

SUMMARY OF THE INVENTION

The present invention is directed towards a method for simulating false locations of a radar transmitter. A plurality of decoy transmitters are located spaciously from each other and the real radar transmitter. The decoy transmitters each have segmented antennas, so that each antenna segment will cover a different portion of a predetermined required azimuth and elevation coverage area. Switching means are associated with each decoy so as to sequentially switch which antenna segments are transmitting, so that each decoy will sequentially cover a different portion of the required coverage area in a cyclical manner. The entire required azimuth and elevation coverage area will be radiated by the decoy transmitters at all times. Each segment covers the full elevation of the coverage area. At least one standby decoy transmitter, which can be switched in place of any non-operating decoy transmitter, is provided.

BRIEF DESCRIPTION OF THE DRAWINGS

FIG. 1 is a diagrammatic showing of a basic illustration of the present invention, and FIG. 2 is a diagrammatic showing of a preferred embodiment of the present invention.

DESCRIPTION OF THE BEST MODE AND PREFERRED EMBODIMENT

The requirement for active decoys is based on the need to counter an anti-radiation missile (ARM) threat. A ground based pulse radar may be vulnerable to ARMS that can be launched at some stand-off range and home on the radiated sidelobe energy.

One option for the radar is to shut down if it could be perceived that an ARM is inbound. This may be difficult for several reasons. First, the radar may be part of an overall missile system and may be required to radiate in order to support on-going missile engagements. Secondly, reliance on ARM detection and identification prior to shut-down is a probabilistic game at best due to small ARM cross-sections and the imperfections in any target discrimination/classification technique.

The only reasonable alternative is active decoys. These decoys are, in general, designed to radiate synchronously pulse-by-pulse with the radar, cover both leading and trailing edges of the radar pulse for all ARM approach geometries of interest (cover pulse decoy) and operate very close in frequency to the radar. FIG. 1. 0 depicts the concept. In order to provide "staying power" to the radar it is desirable that the decoys also survive an ARM attack.

A technique that ensures a high probability of survival for both the radar and the decoys is the blinking decoy field. With this technique only one decoy is on at a time in FIG. 1. It remains on for many pulse emissions, turns off, at which time another decoy immediately turns on. Thus, for three decoys A-C, each decoy is fully on for ⅓ of the time. An important point to note is that when each decoy is on it must provide the full antenna coverage in both azimuth and elevation. For a full cover pulse decoy (which precludes ARM midpulse sampling) the decoy ERP must equal the ERP of the radar radiating through its sidelobes, i.e.:

$$\hat{P}_{TD}G_{TD} = \hat{P}_{TR}G_{TRS} \quad (1)$$

Where:
$\hat{P}_{TD}$ = Decoy peak transmit power at antenna terminals
$G_{TD}$ = Decoy antenna gain
$\hat{P}_{TR}$ = Radar peak power at antenna terminals
$G_{TRS}$ = Radar antenna gain of the sidelobes referred to an omni-directional source Fixing the required coverage in both elevation and azimuth for each decoy effectively fixes $G_{TD}$. Thus, given $P_{TR}$, $G_{TRS}$, and the desired decoy antenna coverage, the decoy peak transmit power $\hat{P}_{TD}$ is determined from equation (1).

The radar 11 has a common antenna 12 which transmits to the antennas 13-15 on the decoys to provide instructions and synchronization: Any of the well known triggering networks can be used. The RF antennas 16-19 are provided for transmitting radar signals.

The present best mode of the invention shown in FIG. 2 was motivated by the desire to minimize decoy transmitter peak power requirements. The technique utilizes sectored antennas D1-D3 to increase the decoy antenna gain thereby reducing transmit peak power. The top view of the geometry is shown. Each decoy still covers the full elevation coverage, but now only covers ⅓ of the required azimuth coverage. In the "1" mode, the decoys only cover the 1 area, in the "2" mode the 2 area, etc. All decoys are always on, however, each covering a different portion of the total azimuth coverage. Since the required azimuth beamwidth is only ⅓ of that required with the true blink situation previously described, the decoy antenna gain is increased by a factor of 3. This, then, reduces the required decoy transmit peak power by a factor of 3. The decoys switch assigned radiation segments (pseudo-blink) at the same rates as the true-blink system. An ARM approaching at any azimuth over the defended region will perceive a blinking decoy field just as intended. If the ARM is in the middle area it would perceive decoy D3 as transmitting in the "1" mode, then when the system blinks to the "2" mode the ARM will perceive decoy D1 as transmitting, etc.

Advantage of this invention is that it reduces transmit peak power relative to a true blink decoy configuration. The decoy transmitter peak power is reduced by a factor equal to the number of decoys used to defend a sector. Reduction of transmitter peak power reduces the transmitter tube size, high voltage power supply and modulator size, prime power size, and results in a smaller, lighter, more reliable and less costly decoy.

The only disadvantage with this technique is the reduction in azimuth coverage, if one or more of the decoys are out of action. This can be offset by placing a spare decoy near the deployment and activating it when one of the decoys cannot radiate. Production cost estimates show that this would still be less expensive than deploying the higher power true-blink decoy configuration.

We claim:

1. A method for simulating false locations of a radar transmitter comprising the steps of locating a plurality of decoy transmitters spaciously from each other and said radar transmitter; providing said decoy transmitters with segmented antennas so that each antenna will cover a different portion of a predetermined required azimuth and elevation coverage area when using a selected portion of its antenna; switching means associated with said decoy transmitters so as to sequentially switch antenna segments which are transmitted on said decoy transmitter transmitters so that each decoy sequentially covers a different portion of said required coverage area in a cyclical manner; and selecting said antennas segments of the decoy transmitters such that the entire required azimuth and elevation coverage area is radiated by the decoy transmitters at all times.

2. A method as set forth in claim 1 further comprising the step of selecting the segments of the antennas such that each segment will cover the full elevation of the coverage area and will cover only a portion of the azimuth coverage area.

3. A method as set forth in claim 2 further comprising the step of providing at least one standby decoy transmitter which can be switched in place of any non-operating decoy transmitter.

4. A method as set forth in claim 2 or 3 further comprising the step of providing more than two decoy transmitters, each of which covers with one portion of the segmented antenna less than one half of the required azimuth area.

* * * * *